June 8, 1965 T. L. SMITH 3,188,122
COUPLING DEVICE FOR FLARELESS TUBING
Filed March 31, 1960
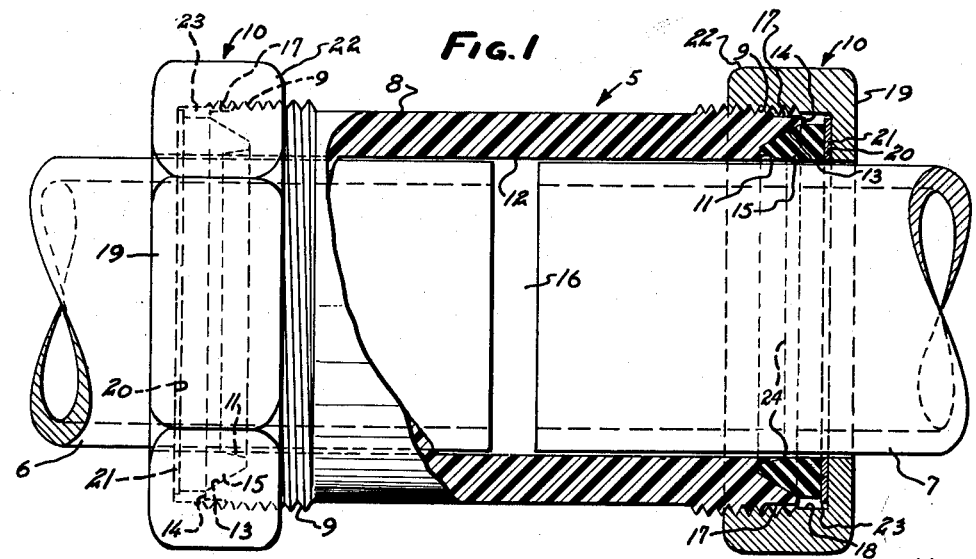
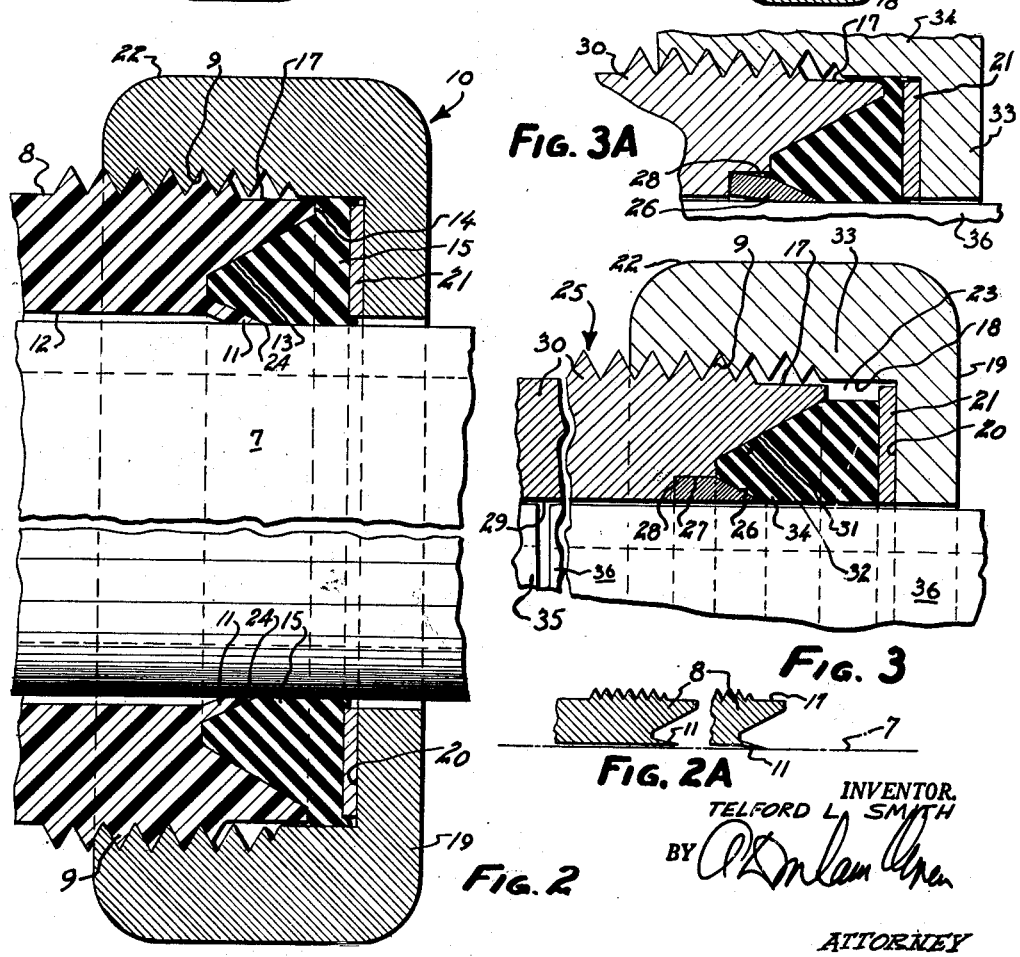
INVENTOR.
TELFORD L. SMITH
BY
ATTORNEY 3,188,122
COUPLING DEVICE FOR FLARELESS TUBING
Telford L. Smith, Los Altos, Calif.
(1206 Lake St., Millbrae, Calif.)
Filed Mar. 31, 1960, Ser. No. 18,982
1 Claim. (Cl. 285—249)

This invention relates to an improved coupling for tubes or pipes and more particularly it relates to a fluid-tight coupling which provides protection for the gaskets from contact with the material flowing through the tubes.

Numerous forms of couplings have been developed in the prior art to provide a means of joining sections of tubing to build pipe lines and other types of fluid-handling systems. The basic problem with such couplings was, of course, to provide a leak-proof coupling, but a particular problem arose where the tubes were used to carry fluids having corrosive or chemically active properties. Such fluids, when contacting certain of the coupling components such as the gaskets, tended to cause deterioration and corrosion of these parts, which seriously reduced the endurance and reliability of the coupling. One attempt to solve this problem of gasket deterioration was to imbed a protective metal lip on the edge of the gasket in order to keep the fluid from the tube joint from reaching the gasket material. The metal lip on these "armoured" gaskets was generally made in the form of a garter-spring to further provide a gripping force on the tube surface to seal the tube and prevent the passage of the fluid.

The armoured-type gasket has proven to be generally unsatisfactory in couplings heretofore used. For one thing, the garter-spring seal is limited in its constrictive gripping force and thus in its sealing capacity, under the higher pressures. The spring is also subject to fatigue and hysteresis after long usage, giving reduced reliability. Installation of the elastic or spring-lipped gasket is more laborious since it entails the stretching operation to fit it over the tubing. Also, the cost of manufacture is relatively high for this complicated type of metallic-lip gasket, which requires the imbedding of the spring into the edge of the flexible neoprene gasket.

Other types of couplings have been used in the prior art to join two tube ends which have been flared or beaded. Couplings of this type have employed threaded-together coupling members in which a ring or sleeve member was slipped over the tube end and wedged or cammed between threaded-together coupling members attached to the tube ends and pressed into frictional clamping engagement with the flared ends of the tube.

A principal object of the present invention is to provide an improved coupling to join end-portions of tubes which have no flaring or beading to seal the tube ends so that no leakage from the coupling will occur at the tube joint and also to protect the gaskets within the coupling from the contact with the fluid.

A further object of this invention is to provide a tube coupling of simple construction having a minimum number of like components including a central sealing portion of some suitable plastic material such as nylon, which has the ability to be elastically deformed while also being chemically inert with substances passing through the tube.

Another object is to provide a coupling for joining tube end portions having a sealing member with a deflectable portion which forms one wall of a cavity to receive a deformable gasket which, when compressed, will move the deflectable portion to grip the tube ends.

It is another object to provide a sealing coupling of greatly simplified construction which is relatively inexpensive to manufacture.

Other objects and advantages of the invention will appear from the following description of the preferred form of my invention which is presented in accordance with 35 U.S.C. 112.

In the drawings:

FIG. 1 is a view in elevation and in section of the present invention with the assembled coupling shown before the end-nuts have been tightened to cause deformation of the deflectable protective lip.

FIG. 2 is an enlarged fragmentary view in section of one end of the coupling of FIG. 1, with the end-nut tightened and the protective lip gripping the tube end to form a fluid-tight seal.

FIG. 2A shows two fragmentary schematic views, in section, of the coupling shown in FIGS. 1 and 2, illustrating a position of the deflectable sealing lip before and after the gasket pressure is applied.

FIG. 3 is a view in elevation and in section of a modified form of the present invention, showing the parts before the clamping nut is tightened.

FIG. 3A is a fragmentary view in section, showing the movable ring in sealing position under gasket pressure.

Broadly considered, the present invention as shown in FIG. 1 is directed to a unique coupling 5 for joining flareless tube-end portions 6 and 7 in a firm, locking, fluid-tight seal. My coupling has a central sleeve member 8 having threaded sections 9 at either end to engage a locking compression nut 10 on each tube-end portion. The sleeve member 8 is preferably made from a solid plastic material and has tapered annular lip portions 11 which form deflectable wall sections around the bore 12 of the sleeve 8 at each end of its bore 12. Each lip portion 11 also serves as a deflectable wall for annular slot-like cavities or recesses which form gasket seats 13 in each end-face 14 of the sleeve 8. The gasket seats 13 are shaped to receive deformable gaskets 15 which are held in place within the end compression or thimble nuts 10 which are attached for axial movement to each end of the sleeve 8. Each nut 10, when tightened along the sleeve 8, presses its deformable gasket 15 against the sleeve-face 14, causing the gasket 15 to flow or deform into the annular gasket seat 13, thus forcing the deflectable lip 11 to deflect inwardly and press tightly against the outer surface of the tubes 6 or 7 to form a fluid-tight seal.

In use, my invention prevents any fluid, escaping from the opening 16 between adjoining tube ends 6 and 7, from passing along the tubes beyond the sealing lips 11, thus confining contact of the fluid to the inert sleeve 8 of the coupling 5 and preventing it from contacting the gaskets 15.

While the drawings illustrate only a straight in-line coupling of two tubing sections, the principle of my invention can be applied to all types of commonly used tubing connections such as T-connections, elbows, and the like. The alteration required from the example shown in FIGS. 1–3 would be in the shape and form of the central plastic sleeve member 8, which could be made to conform to a connection of any desired shape. The central tubular sleeve member could also be flexible in its center portion rather than rigid where such a feature was necessary to provide a bend in the conduit. But in accordance with my invention, the sleeve 8 in all cases would have a novel end gasket seat 13 and a deflectable lip portion 11 at each outlet end to cooperate with deformable gasket 15 with means to force the gasket 15 into the gasket seat 13.

I will describe now in greater detail the preferred form of my invention as shown in FIGS. 1 and 2. In practice, the end poritons 6 and 7 of the adjoining tubes are brought together in as near abutment as possible, which usually results in a small opening 16 between the tube ends. The opening 16 is not particularly disadvantageous and a feature of my invention is that wide gaps can easily be accommodated by merely making the sleeve 8 of sufficient length so that an adequate amount of gripping area on the tube ends 6 and 7 is covered by the deflectable gripping lip 11 to permit a firm seal. The sleeve 8 is generally tubular in shape, with its central bore 12 having a diameter somewhat larger than the tube outer diameter. The clearance between sleeve 8 and the tubes 6 and 7 should be great enough to permit an easy slide-on installation, while keeping the annular gripping lips 11 close enough to the tube surface so that they need not deflect too far to provide an effective seal. I have found that clearance of from .001 inch to .015 inch gives excellent sealing results, while still allowing ease of installation.

The tubular sleeve 8 is made from some suitable type of plastic material that is easily cast or machined and yet has a certain amount of elasticity or resiliency so that it will not be permanently deformed when installed and can thus be easily removable and re-usable. For this purpose, I have found that a synthetic resin material such as solid nylon to be highly satisfactory, since it can be molded readily into sharp, well defined sections which have the required flexibility and yet are strong. Another desirable feature of nylon is its well-known chemical resistance to substances such as certain acids, solvents, oils, refrigerants, and other types of fluids, often passed through conduits.

On each end-face 14 of the tubular sleeve member 8, I form an annular groove or slot-like gasket seat 13 which tapers inwardly from the end-face 14 as shown in FIG. 1. In forming the recess or gasket seat 13, I prefer to shape the depression commencing at the inner edge 24 of each end of the bore 12, tapering the sleeve 8 radially away from the center line of the bore 12 at an angle of approximately 15° to 30°. This procedure forms the annular tapered lip portion 11 which also comprises a continuous inner wall for the annular cavity or gasket seat 13. I have found that the lip angle is not critical as long as adequate flexibility of the sealing-lip 11 is obtained. It is necessary only that this integral annular lip member 11 be of sufficient length to be movable inwardly in response to pressure exerted within the gasket seat 13, so that the lip 11 will grip the tube surface and make a proper seal without wrinkling radially around the tube. The length of the lip-portions 11 may be varied to suit the particular application of the coupling, considering the force that can be applied to the compression-nuts during installation and the fluid pressure within the tubing. For example, a lip length of .125 inch will supply sufficient gripping contact to adequately seal tubes up to 2 inches in diameter. It should be emphasized, of course, that my coupling is not limited to any particular range of tube diameter.

On the sleeve member 8, extending beyond each threaded section 9, is provided a smooth unthreaded portion 17 which is adapted to fit within a compression nut 10. The compression-nuts 10 are formed having a generally annular pressure-end-plate 19 integral with an internally threaded barrel portion 22. A central bore in the end-plate 19 provides the aperture through which the tube 7 passes into the sleeve 8. The internal threads of the nut 10 extend inwardly along the barrel portion 22 for less than its entire length, providing a smooth unthreaded internal wall portion 18 at its innermost end, which is slightly larger in diameter than the unthreaded end portions 17 on the sleeve 8. Thus, when each compression-nut 10 is taken up along the sleeve 8, the smooth wall portion 18 slides over the end portion 17 of the sleeve 8 and an enclosed annular variable volume chamber 23 is formed by the combined inner walls of the compression-nut 10, the sleeve 8, and the outer surface of the tube.

Retained within each compression nut 10 and adjacent the inner surface 20 of nut body portion 19 is the pressure-transmitting gasket member 15. The gaskets 15 of my invention are generally formed from rubber or some rubber-like elastomeric composition which is deformable under pressure so that, when pressed into a confined space provided by the annular gasket seat 13, they will take the shape of the gasket seat 13 and transmit the pressure to all the interior walls thereof. Washers 21 are placed on the inner surface 20 of the nut body portion 19 adjacent to the gasket 15, to provide a sliding inner surface 20 for the nuts 10 as they are rotated and tightened. Thus, the only stress imparted to the gaskets 15 is an axial force.

When installed, the coupling 5 embodying the principles of my invention effects a tight gripping seal on the tube ends 6, as illustrated in FIG. 2. The compression nuts 10 are tightened to the desired degree by threading them along the sleeve 8. This axial movement by the nuts 10 along the sleeve 8 forms the annular pressure chambers 23 and presses against the gaskets 15, causing them to deform and elastically flow into their respective annular gasket seats 13. The pressure created within each gasket seat 13 by the gasket 15 thus causes the annular lip 11 to deflect inwardly to tightly grip each tube end. Since an enclosed chamber 23 has been formed at both ends of the sleeve 10 by the overlapping of the nuts 10 thereon, a gasket 15 is confined in each chamber 23 and can deform only against the movable lip portion 11. Thus, with only slight rotation of the compression nuts, the grip of the lip portion 11 can be controlled to whatever degree required. Aside from the tightening of nuts 10, no rotational or sliding type of movement between the coupling tube-gripping components need take place to increase the seal created by the lips 11.

To more clearly show the novel sealing action of my invention, I have illustrated schematically, in FIG. 2A, the movement of the deflectable lip 11, as pressure acts to deflect it inwardly around the tube.

When pressure is applied to the gaskets 15, the effect produced by my invention in one of transmitting the pressure created by the compression nuts 10 through the deformable plastic gaskets 15 to provide a continual loading directly to the deflectable tip portion 11. This feature is highly important, since it eliminates any friction of wedge-like components heretofore used and it enables greater tightening pressures to be obtained while wear on the parts is reduced. The elasticity of the central sleeve 8 allows the lip portions 11 to return to their normal position when the pressure is released and the coupling 5 can be removed easily and re-used. Most important of all, the seal obtained on the tube is so effective that none of the fluid within the tubing will ever escape to come in contact with and harm the gaskets 15.

In FIG. 3 I have illustrated a coupling 25 which, in a modified form, embodies the same basic principles of the present invention that are utilized with the preferred form of FIG. 1. In place of the deflectable integral lip portions 11 on the sleeve 8, shown in the modification of FIGS. 1 and 2, I use on coupling 25 a separate protective movable ring member 26 which performs the sealing function. The ring 26 is preferably formed from some type of relatively soft malleable metal such as lead or copper and is seated in an annular notch 27 which is formed near the inner edge 28 of each end of the bore 29 of a tubular sleeve 30. If desired, the ring 26 may be constructed from nylon or some suitable plastic material such as is used on the deflectable lip 11 of FIGS. 1 and 2. The depth of the notch 27 is no greater than the wall thickness of the ring 26, which may be shaped generally rectangular or triangular in annular cross-section.

The sleeve 30 may be made from any suitable material and is flared outwardly from the notches 27 at both ends to form a fixed tapered outer wall 31. This outer wall 31 and the sealing ring 26 form an annular gasket seat 32, which, like the gasket seat 13 of FIG. 1, has an inner wall section furnished by ring 26 that will move inwardly in response to pressure within the gasket seat 32.

In FIG. 3, compression nuts 33 and rubber or rubber-like gaskets 34 are fixed in the same relationship as described above with reference to the preferred form of the invention. Therefore, as shown in FIG. 3A, by tightening the nuts 33 the gaskets 34 are pressed into the annular cavity or gasket seat 32, causing the sealing ring 26 to deform slightly and press against the surface of the tubes 35 and 36 to seal off any fluid from the tube joint. When this tightening occurs, the gasket 34 also flows out to fill the space inside the nut 33.

From the foregoing it is seen that the present invention provides a highly effective coupling which not only makes possible a strong, reliable fluid-tight seal, but also protects normally wearable coupling components such as gaskets from contact with the harmful fluids flowing in the conduit.

The simplicity of construction of my novel device, as well as the inexpensive materials utilized, serves to provide a substantial economy in manufacture over tube couplings found in the prior art. My coupling also requires no modification of the tube ends, such as beading, threading, or flaring.

It is also apparent that my coupling can be applied to tubing conduits of all sizes, and systems utilizing all types of deleterious substances which might otherwise harm coupling components. The structural elasticity of the loosely fitting sleeve member allows my coupling to be installed readily upon, and removed from, the tube ends, so that the coupling can be inspects easily and also reused many times, when necessary.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A coupling for unthreaded flareless tubing and the like comprising in combination:

a tubular sleeve of deformable synthetic resin material having a bore adapted to receive the end of a rigid non-deformable tube section to be coupled, said bore having a diameter forming a clearance with said tube section which provides a loose, slide-on fit;

an annular recess formed in the end face of said sleeve, the walls defining said recess as seen in section diverging from a point within said wall to the outer face, the inner one of said walls being tapered axially and outwardly away from the axial centerline of the sleeve bore starting from the inner end edge thereof and continuing to said point thereby forming an axially extending and substantially knife edge annular lip member, said lip member being deflectable radially inwardly to engage the tube section, the walls of said recess defining a gasket seat;

an annular deformable gasket member of elastomeric material adapted to fit into said gasket seat and extending axially beyond the end of said sleeve; the diameter of the extending portion of said gasket being less than the outside diameter of said tubular sleeve;

an end compression thimble nut having an axially extending threaded part and an integral radially extending flange part, located about the tube being coupled and threadedly attached to said sleeve for generating an axial force against said gasket, the outer wall of the end of said tube being supported against any substantial radial deflection by the inner wall of the threaded portion of said nut, the inner diameter of said axially extending part being greater than said outer diameter of said gasket extending part whereby a gasket extrusion recess is formed by said tube end, said gasket and said nut, said nut when tightened acting to push said gasket axially into said annular recess and to extrude same into said cavity to simultaneously produce a continual loading on and thereby causing said annular lip member to deflect inwardly with a uniform circumferential pressure to form an annular lip seal around the tube, whereby fluid within the tube is prevented by said lip member from contacting the gasket, and causing chemical deterioration thereof.

References Cited by the Examiner
UNITED STATES PATENTS

| | | | |
|---|---|---|---|
| 317,408 | 5/85 | Moeser | 285—341 |
| 634,820 | 10/99 | Henry et al. | |
| 755,204 | 3/04 | Witzenmann | 285—249 |
| 808,512 | 12/05 | Cook. | |
| 922,471 | 5/09 | Glauber. | |
| 1,363,565 | 12/20 | Christenson. | |
| 2,177,184 | 10/39 | Martin | 285—342 |
| 2,192,565 | 3/40 | Szekely | 285—354 |
| 2,247,031 | 6/41 | Norton | 285—342 |
| 2,474,880 | 7/49 | Woodling | 285—334.5 |
| 2,669,465 | 2/54 | Newell | 285—53 |
| 2,670,973 | 3/54 | Ginther et al. | |
| 2,755,110 | 7/56 | Jacobs | 285—322 |
| 2,760,794 | 8/56 | Hortranft. | |

CARL W. TOMLIN, *Primary Examiner.*

ARTHUR B. MILLER, *Examiner.*